United States Patent [19]

Repperger et al.

[11] Patent Number: 4,632,341

[45] Date of Patent: Dec. 30, 1986

[54] STABILIZING FORCE FEEDBACK IN BIO-ACTUATED CONTROL SYSTEMS

[75] Inventors: Daniel W. Repperger, Vandalia; Donald G. McCollor, Springboro; William G. Gruesbeck, Gettysburg, all of Ohio

[73] Assignee: The United States of America as represented by the Secretary of the Air Force, Washington, D.C.

[21] Appl. No.: 698,963

[22] Filed: Feb. 6, 1985

[51] Int. Cl.$^4$ .............................................. B64C 13/04
[52] U.S. Cl. ..................................... 244/230; 244/234; 244/76 R; 244/175
[58] Field of Search ............... 244/234, 223, 227, 221, 244/236, 228, 230, 178, 75 R, 175, 195, 196, 76 R, 197; 414/5; 901/9

[56] References Cited

U.S. PATENT DOCUMENTS

| | | | |
|---|---|---|---|
| 2,630,284 | 3/1953 | Feeney | 244/228 |
| 2,780,426 | 2/1957 | Kutzler | 244/175 |
| 3,002,714 | 10/1961 | Decker | 244/223 |
| 3,106,371 | 10/1963 | Brannin et al. | 244/234 |
| 3,119,580 | 1/1964 | Murphy | 244/234 |
| 4,158,196 | 6/1979 | Crawford, Jr. | 340/163 |
| 4,278,920 | 7/1981 | Ruoff, Jr. | 318/2 |
| 4,345,195 | 8/1982 | Griffith et al. | 318/628 |
| 4,398,889 | 8/1983 | Lam et al. | 434/45 |
| 4,426,607 | 1/1984 | Black et al. | 318/628 |
| 4,477,043 | 10/1984 | Repperger | 244/230 |

Primary Examiner—Galen Barefoot
Attorney, Agent, or Firm—Gerald B. Hollins; Donald J. Singer

[57] ABSTRACT

A biomechanical feedback arrangement wherein a varying force tending to improve the neuromotor tracking response of a human subject, particularly in the presence of lateral or front-back G force fields, is added to the test subject input member of a feedback control system. Use of the biomechanical feedback in a high-performance aircraft and in a ground-based simulator apparatus is also disclosed, along with comparison results from simulator testing of human subjects.

10 Claims, 8 Drawing Figures

U.S. Patent Dec. 30, 1986 Sheet 1 of 4 4,632,341
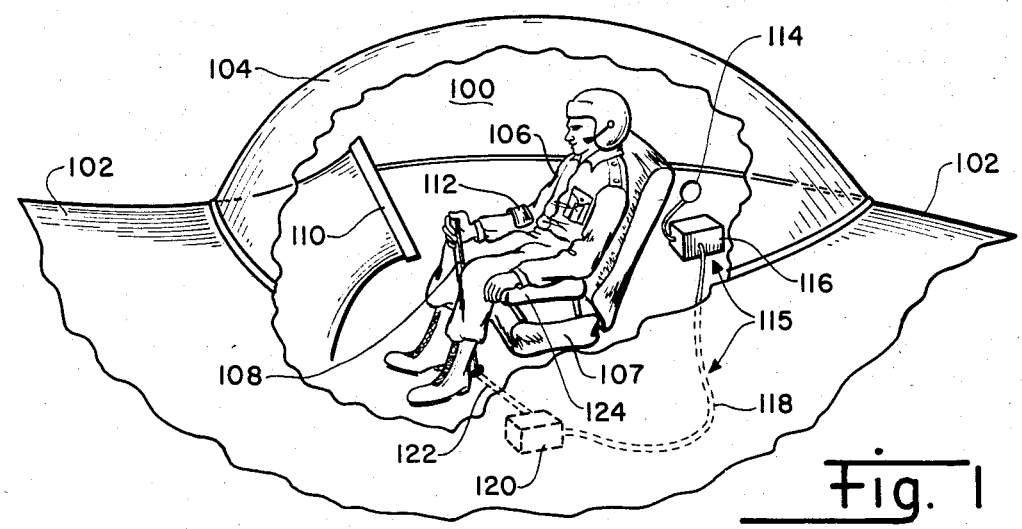
Fig. 1
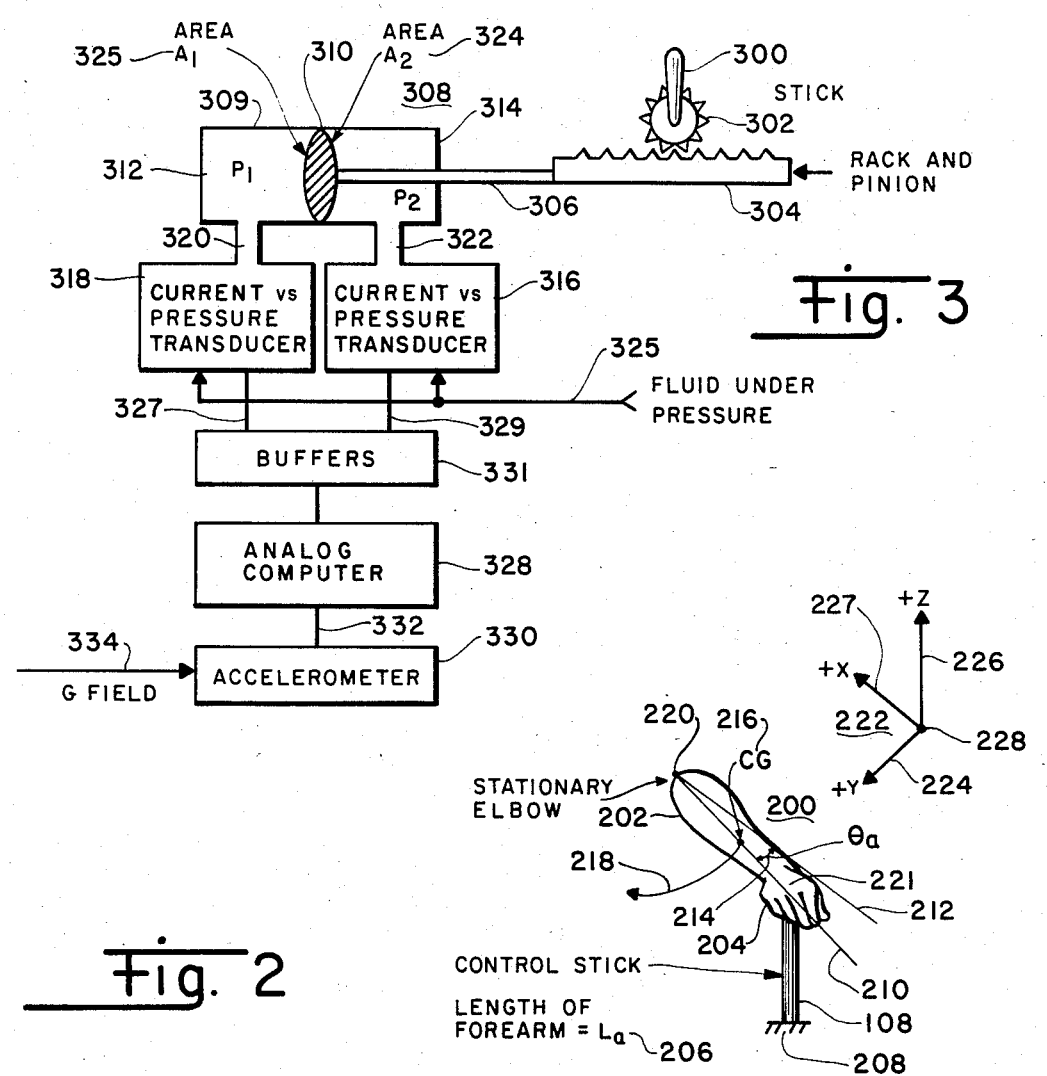
Fig. 3
Fig. 2

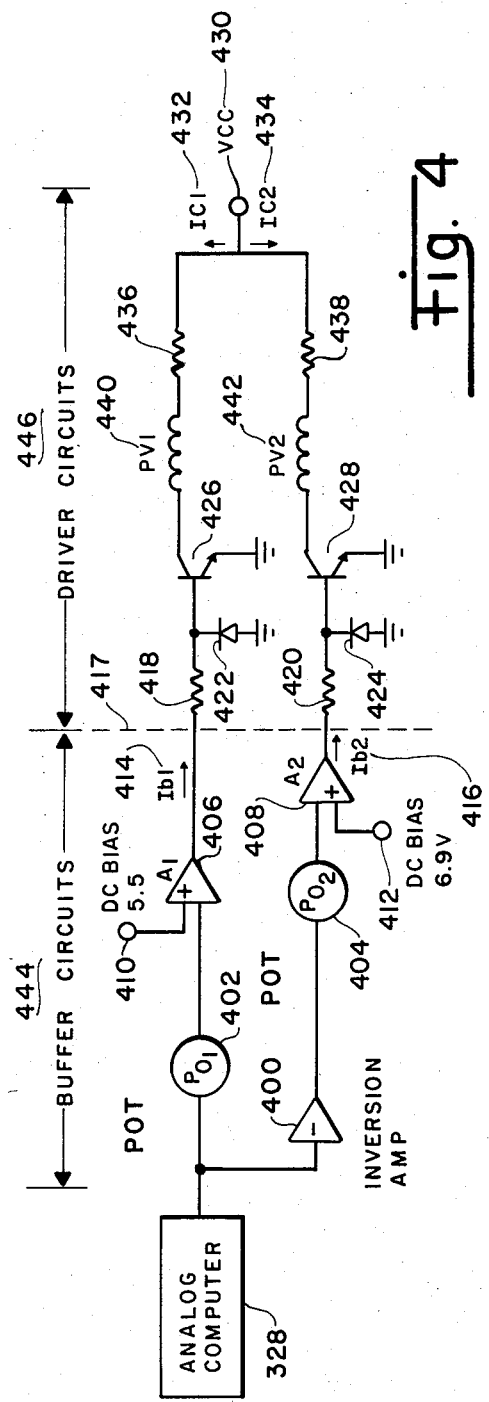
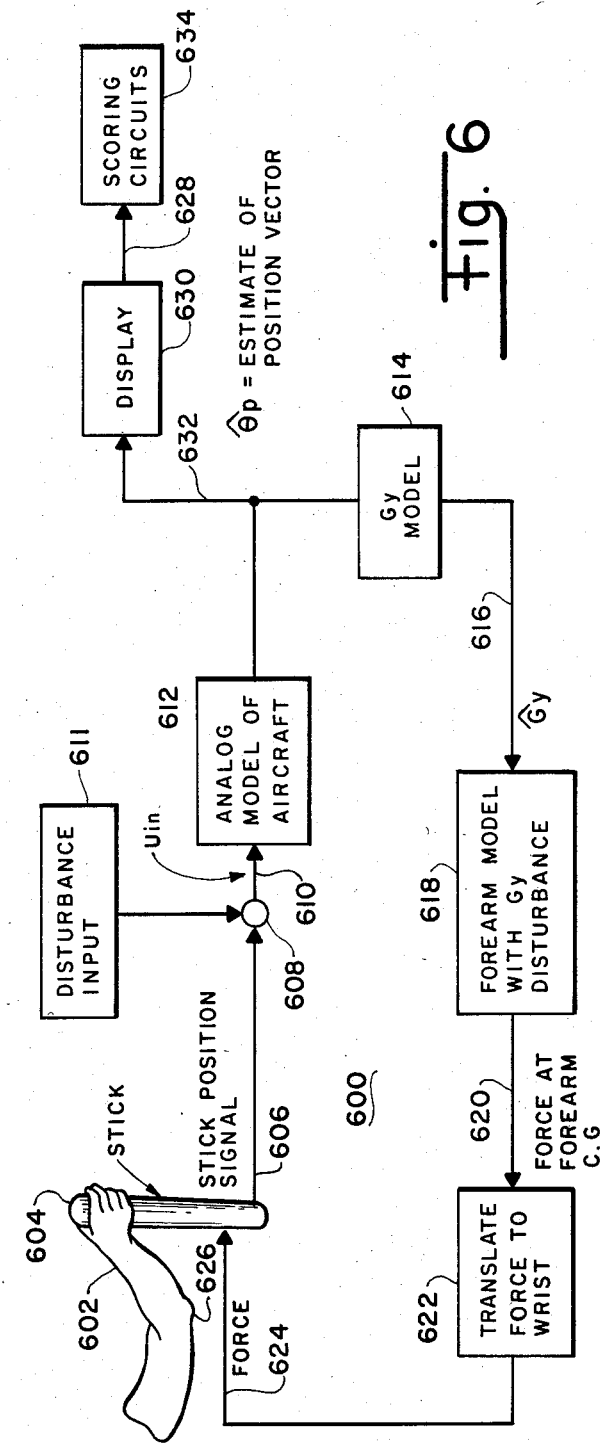

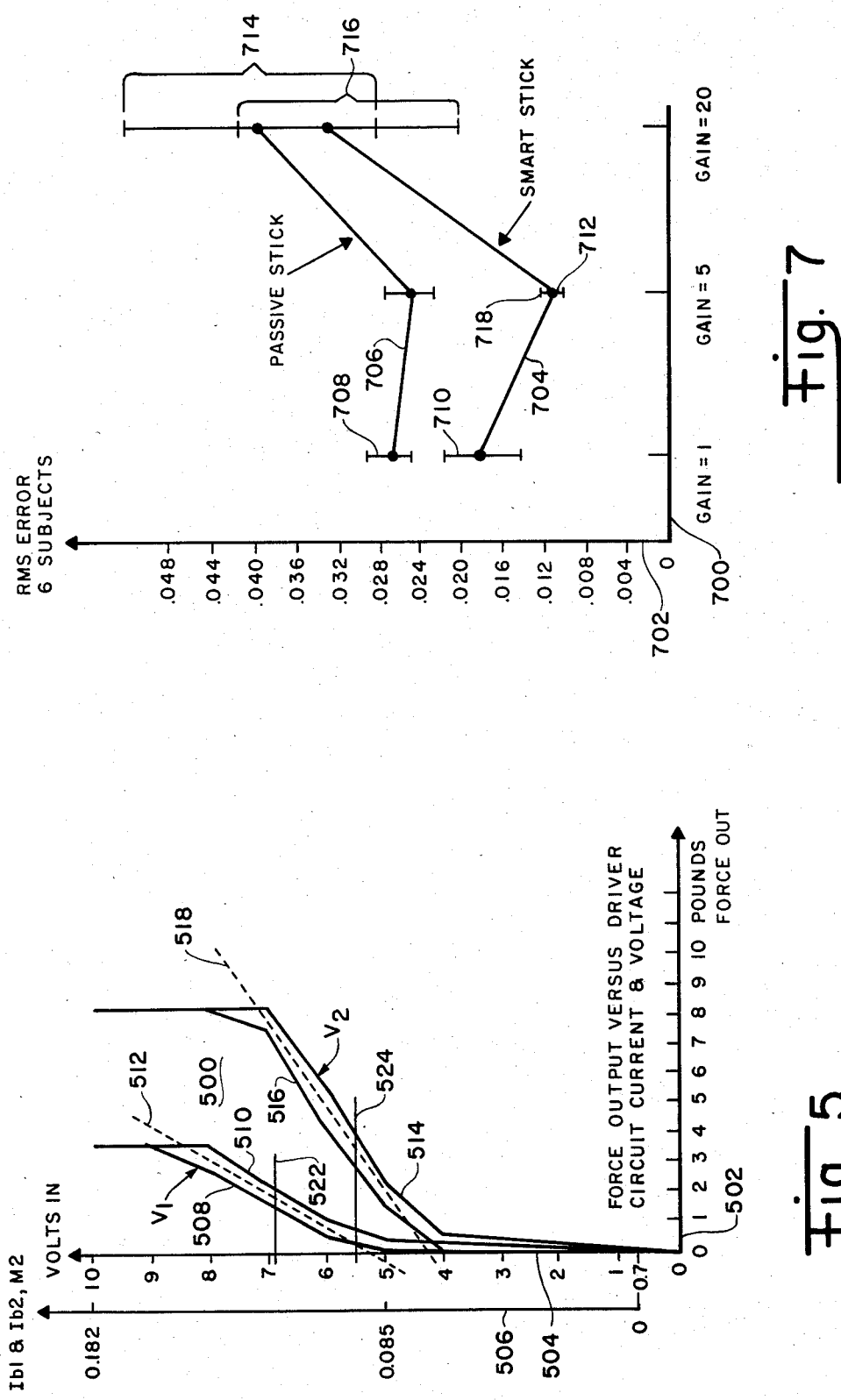

STABILIZING FORCE FEEDBACK IN BIO-ACTUATED CONTROL SYSTEMS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of closed-loop feedback control systems having a human operator or other living biological specimen incorporated in the closed loop, and having disturbance or noise functions present.

Instances wherein human beings, primates, or other living creatures are situated in closed-loop electromechanical feedback systems occur frequently in present-day technical apparatus. Examples of human-involved feedback arrangements include the thermostat controls of an environmental temperature regulator e.g., a furnace or air conditioner in a house, an electric blanket with temperature controls, a pinball machine or video game and the operation of automobiles, boats and aircraft. In each of these faeedback systems the human or biological specimen serves as a controller of a relatively large energy delivery system and employs one or more of the human senses in performing the controlling operation and closing a feedback loop. Human temperature sensitivity is employed in the first of these examples, while sensitivity to visual, audible and other stimuli are employed in the latter and more complex examples. In the medical art, examples of human feedback arrangements and abnormal conditions which interfere with the operation of these feedback arrangements are found; these arrangements include the acts of eating and moving objects by human manipulation. In this field there is also encountered the disruption of intended feedback arrangements by infirmities such as Parkinson's disease, where a noise or extraneous interference signal is imposed on normal feedback loop functioning.

A particularly demanding example of a feedback system involving a human operator is found where a moving vehicle is required to track a predescribed course or an externally-determined trajectory a trajectory that imposes resolution and response frequency parameters approaching the limits of human operator capability. A notable specific example of this type is found in the demands placed on the pilot of a modern high-performance aircraft such as the currently used F-15 and F-16 fighters and by the flight simulators used to train and test these pilots. These aircraft are in addition capable of subjecting a pilot to acceleration forces or G field forces of several times the force of gravity and moreover of inducing these G forces along a plurality of coordinate axis directions during tracking or other maneuvering departures of the aircraft from straight level flight. The magnitude and direction of the G forces developed in present-day aircraft has reached the range of posing a threat to the ability of a human operator to adequately control the feedback system (i.e., the aircraft), in an optimum and safe manner.

Numerous examples of feedback systems involving control by a human operator are also found in the patent art. These examples include the patent of George E. Crawford, Jr., U.S. Pat. No. 4,158,196, which is concerned with a man-machine interface system such as might be used in controlling the movements of a wheelchair. In the Crawford patent the controlling signals are derived from electrodes placed on the body of the wheelchair occupant so as to respond to muscle stimulus signals or alternately are arranged to respond to some predetermined code, such as Morse code generated by the controlling subject. The Crawford apparatus is of the type providing open-loop control of the work member except for the loop closing provided by the human subject. The Crawford apparatus appears principally concerned with avoiding a manual force input apparatus for the electrically operated control system.

An arrangement employing force feedback in a control system is shown in the patent of Carl F. Ruoff, Jr., U.S. Pat. No. 4,278,920, which concerns a workpiece manipulator such as might be employed in the machine tool art. According to the Ruoff invention, the work positioning servosystem is programmed by recording and re-using the control parameters generated during a manual transfer of the workpiece between two work positions, the manual transfer events being sensed by a collection of position and force responsive transducers. The Ruoff patent appears principally concerned with the addition of force signals to the previously used position signals in achieving this servo programming operation. The Ruoff patent appears unconcerned with the forces observed by the human operator of the servosystem or with the generation of forces which will aid the human operator in performing a transfer or tracking operation.

An example of a control system which accommodates both a human operator and the characteristics of an aircraft is found in the patent of Carl D. Griffith et al., U.S. Pat. No. 4,345,195, which concerns an improved servoactuator apparatus for an aircraft such as a helicopter. The Griffith patent is concerned with the servosystem used to operate control surfaces of the helicopter in response to the pilot's movement of the helicopter control stick. To this end, the Griffith apparatus includes a servo-controlled "feel" spring which provides the pilot with a manual indication of forces being exerted by the aircraft control surfaces. This is in similarity to the feeling experienced by a pilot operating an aircraft having only simple mechanical linkage between the control stick and the aircraft control surfaces. The force received by the aircraft pilot in the Griffith invention is related to the aircraft control surface loading, that is, to the force of the air stream engaging the control surfaces. Such forces are known in the aircraft art to relate to the airstream velocity, the control surface displacement from a neutral position, the relative attitude and velocity of the aircraft and several other factors. The Griffith patent also contemplates use of the "feel" spring as a path for applying other non feel related forces to the aircraft control stick as indicated at column 8, line 14; and column 9, line 44. In a related patent to the Griffith patent, U.S. Pat. No. 4,426,607, inventors Homer D. Black et al. describe a differential linkage apparatus which is compatible with the servoactuator apparatus of the Griffith invention.

Another control system relating to aircraft is shown in the patent of Wilhelmus J. Lam, U.S. Pat. No. 4,398,889, Which discloses improvements to a flight simulator whereby the pilot's control stick is impressed with forces representing the response of a controlled member such as an aircraft under simulated flight conditions. The signals applied to the control stick in the Lam apparatus are derived from first and second integrator circuits and are intended to provide the pilot with the correct "feel" at the control stick for the flight conditions under simulation.

An arrangement for changing the characteristics of an aircraft control stick in response to G forces sensed by an accelerometer is also shown in my prior patent, U.S. Pat. No. 4,477,043. In this patent an electric motor is used to compress a spring member that opposes movement of the control stick away from a center or neutral position. Alternate embodiments shown in this patent indicate that compression of the stick opposing spring exerts a force on the aircraft control stick—a force tending to restore the stick to a neutral position. The '043 patent does not consider the consequence of noise or muscle tremor signals originating with a pilot or arrangements for minimizing the effects of such signals in an aircraft apparatus. The disclosure of the U.S. Pat. No. 4,477,043 patent is hereby incorporated by reference herein.

SUMMARY OF THE INVENTION

An object of the invention is to provide an arrangement for reducing the effects of human noise or muscle tremor in the operation of a feedback system.

Another object of the invention is to enhance the performance of a human operator or other biological specimen in operating a feedback system in the presence of acceleration or G force fields.

Another object of the invention is to provide a G force acceleration responsive aircraft pilot assistance which is active along one coordinate axis with respect to an aircraft, or alternately, is active along several coordinate axes with respect to the aircraft.

Another object of the invention is to provide a stabilizing arrangement capable of reducing the noise or tremor component introduced into feedback systems by normal human subjects and intensified in effect in persons affected with certain disease conditions.

Another object of the invention is to improve upon and further use the control stick apparatus of my prior 043 patent.

Another object of the invention is to provide a simulation environment in which a human operator can become accustomed to the improvements of the present invention and in which the performance of human operators having the benefit of the present invention can be evaluated.

Another object of the invention is to enhance the ability of a human pilot to cope with and adequately perform in a modern high-performance military aircraft.

These and other objects of the invention are achieved by an aircraft tracking apparatus having aircraft maneuvering controls located adjacent a pilot supporting seat in an aircraft cockpit apparatus and means for conveying a predescribed course to be tracked and a tracking error signal to said pilot, means for generating a signal representing the incurred G force acceleration of said aircraft along one axis of a coordinate axis set, and means for decreasing the muscle tremor movements applied to said maneuvering controls during agonistic to antagonistic muscle set transfer movements by said pilot, said means for decreasing including bias force transducer means responsive to said G force acceleration signal for supplying a biasing force to said maneuvering controls.

BRIEF DESCRIPTION OF THE DRAWINGS

FIG. 1 is an overall view of a human-controlled feedback apparatus in the form of an aircraft and a pilot.

FIG. 2 is a force and motion diagram showing portions of the FIG. 1 apparatus including a part of the pilot's arm and the aircraft control stick.

FIG. 3 is a block diagram of a pilot assistance arrangement involving the showings of FIG. 1 and FIG. 2.

FIG. 4 is a more detailed description of portions of the FIG. 3 apparatus.

FIG. 5 is a characteristic description of portions of the FIG. 4 apparatus.

FIG. 6 is a block diagram of a simulation arrangement usable in studying or in acclimating to the present invention.

FIG. 7 is a performance comparison of the present invention with conventional systems.

DETAILED DESCRIPTION

Figure 8:
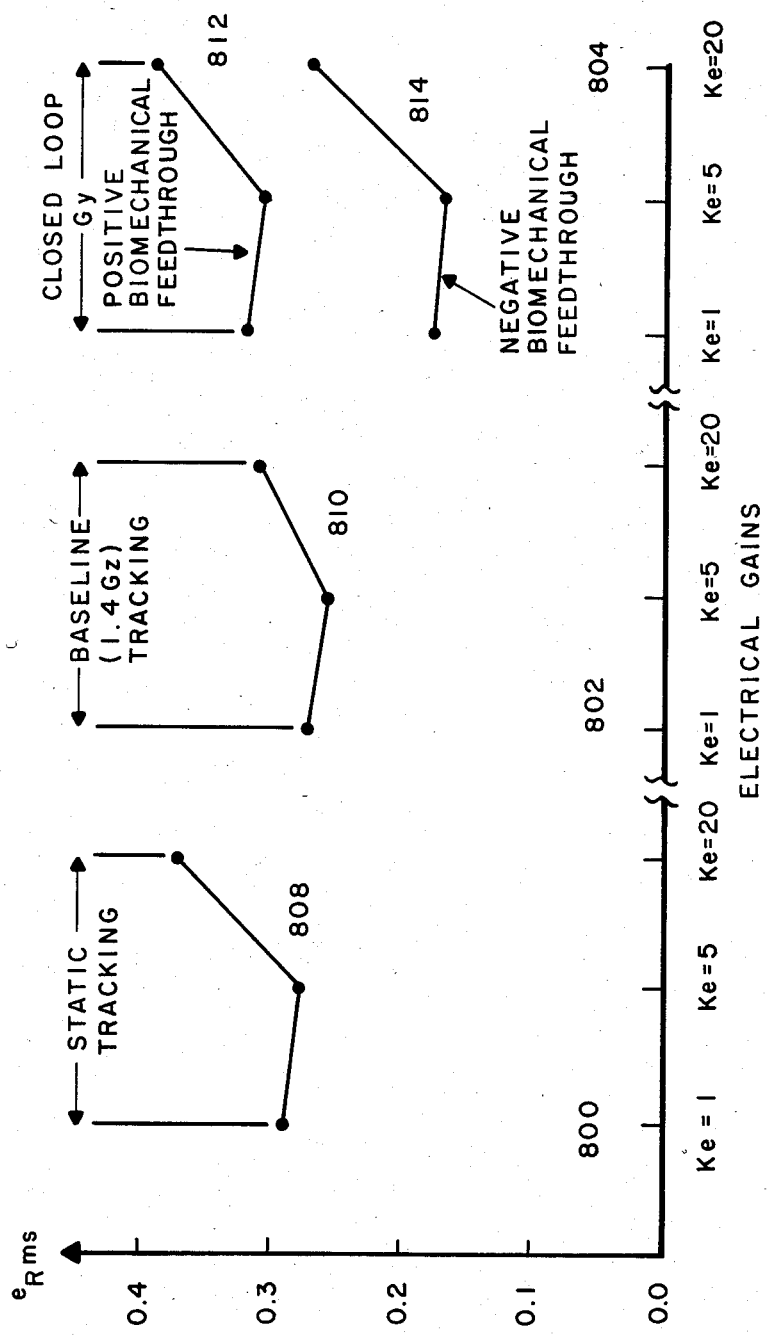
FIG. 8 is an additional performance comparison of the present invention with other systems.

In FIG. 1 of the drawings there is shown one utilization of the present invention, a utilization involving the pilot of a single-seat fighter aircraft. In FIG. 1 the aircraft cockpit is shown at 100 while the fuselage and cockpit canopy are shown at 102 and 104, and the pilot and pilot seat are shown at 106 and 107. The pilot 106 in FIG. 1 is provided with a control stick 108 and an instrument panel 110 for use in controlling the aircraft. The control stick 108 is shown in FIG. 1 in the form of a single upright joystick of the type used in single-seat fighter aircraft; it is understood, however, that the control column and wheel arrangement commonly used in multi-engine, multi-seat aircraft could also be used with the invention.

Also shown in FIG. 1 is a restraint 112 for the arm the pilot uses in operating the control stick 108 and a G force responsive pilot assistance system 115. The pilot assistance system 115 includes a G force-to-electrical signal transducer 114, a computer apparatus enclosure 116, and an electrical-to-mechanical transducer enclosure 120. The computer apparatus enclosure 116 is connected with the transducer apparatus enclosure 120 by way of electrical signal coupling path 118 and the electrical-to-mechanical transducer is connected with the control stick 108 by way of a mechanical signal coupling path 122. Details of the signal coupling paths 118 and 122 are described below.

The control stick 108 is reproduced in FIG. 2 of the drawings along with a representation of the pilot's forearm 202 and indications of the forces and movements relating to the control stick 108 and the forearm 202 during operation of the present invention. In the FIG. 2 drawing it is presumed that the pilot's elbow is held stationary at the point 220—the point where an elbow would remain in contact with an armrest of the type shown at 124 in FIG. 1. The restraint 112 shown in FIG. 1 serves to assist the pilot in maintaining a stationary elbow posture when desired; restraint devices of this type are optionally used in high-performance aircraft as a supplement to the pilot's natural tendency to sit in a fixed elbow posture. Such restraint devices complement a fixed elbow tendency that is already promoted by downward-directed G force fields, that is, fields such as the Earth's G field having a component directed 180° opposite of the positive G force field indicated at 226 in FIG. 2.

The line 210 in FIG. 2 indicates the centroid of the pilot's forearm, this centroid incorporates or passes through the forearm center of gravity point 216, the stationary elbow point 220, and includes an intersection 221 between the pilot's hand and the top of the control stick 108. The line 212 and the angle $\theta$ shown at 214 in FIG. 2 measure one type of movement which the pilot 106 can impart to the control stick 108; this movement is in the y-axis direction as is indicated by the vector 224 in the orthogonal group of vectors 222 at the point 228 in FIG. 2. Such y-axis movement is in the direction of left and right with respect to the pilot 106, notwithstanding the appearance and perspective distortion which result from the frontal oblique viewing angle of FIG. 2.

It should be realized that the stabilizing force feedback arrangement of the present invention when incorporated into an aircraft can be configured to provide pilot assistance along any one or any combination of the three coordinate axes shown at 222 in FIG. 2; that is, the feedback arrangement may be disposed to provide assistance in the y axis or vector 224 direction along the orientation of left and right with respect to the pilot 106, or in the x axis or vector 227 direction, along the frontward and backward orientation with respect to the pilot, or along the z axis or vector 226 direction up and down with respect to the pilot 106, or in any combination of these three axis orientations. For the purpose of the present description, implementation of the invention to provide y-axis assistance to the pilot, that is, assistance in the orientation of left and right is described, such assistance is especially helpful in the case of G forces resulting from a left or right turning or yawing of the aircraft and is more easily described than are the forces and movements for the other axes or combinations of axes.

Also shown in FIG. 2 is a vector 218 representing the force acting on the pilot's forearm 202 in the presence of positive Y axis G forces, that is, the force resulting from the G force fields induced by a left turning of the aircraft; the force vector 218 is presumed for analysis purposes to act on the center of gravity 216 of the pilot's forearm. At 208 in FIG. 2, a grounded or fixed position characteristic for the control stick 108 is indicated. In actual practice, it is desirable for an aircraft control stick to undergo at least a limited degree of pilot-involved movement in order to afford "feeling" and psychological reward and other benefits to the pilot. Since fixed position control sticks, although technically feasible using strain gauge sensors and other state-of-the-art techniques, have been found less desirable than are control sticks providing some limited degree of motion, the grounding or fixed position nature indicated at 208 is to be understood as a drawing convenience. The stick controller considered here actually moves a distance $\theta_a$ as is indicated in FIG. 2.

The technical paper "Results from a Biomechanical Stick Study", by D. W. Repperger, J. W. Frazier, and R. E. Van Patten, presented at the 1983 Aerospace Medical Association meeting in May 1983, at Houston TX, and located at pages 192–193 in the Proceedings of this meeting, describes the possibility of both helpful and disruptive forms of feedback or feedthrough between G forces incurred by an aircraft pilot and the movements required of the pilot for controlling an aircraft. This paper, called the "stick study" paper herein, also defines the term "positive biomechanical feedthrough" as the condition existing when a stick movement in the +y direction gives rise to a G force in the +y direction, and "negative biomechanical feedthrough" as the condition existing when a control stick movement in the +y direction gives rise to a G force in the −y direction. A system which employs negative biomechanical feedthrough is therefore altered to the positive biomechanical feedthrough condition by a reversal of the feedthrough force. The stick study paper also suggests that if the stick characteristics in an aircraft could be changed via a computer, that improved pilot tracking performance could result. The stick study paper, however, stops short of suggesting implementation of negative biomechanical feedthrough in the form of applying a G field compensating force to an aircraft control stick and also does not reach the level of relieving the pilot of performing agonistic-antagonistic muscle movements which tend to produce tremor or noise inputs to the aircraft control system.

One aspect of the present invention therefore contemplates sensing the G field incurred by the aircraft shown in FIG. 1 in, for example, the +y and −y axis directions, using a transducer such as is indicated at 114 in FIG. 1, followed by developing a G field compensating force according to a predetermined relationship and applying this force using a second transducer device to the control stick 108. The computer used in implementing the control stick force may be of course either of the digital or analog type, however, for system simulation purposes as is described subsequently herein, an analog computer has been found desirable. The employed computer is housed at some convenient location in the FIG. 1 aircraft as indicated by the enclosure 116 and can receive signals remotely from the transducer 114 or can have a G field sensing transducer integrally incorporated.

The forces relevant to a force feedback system of the type represented in FIG. 1 may be analyzed according to the parameters described in FIG. 2 by assuming that movement of the control stick 108 is opposed by a resilient force having a spring constant of $K_s$ and by an energy loss dissipating member such as a dashpot having a movement opposing force of $B_s$. Using these forces and assuming the length of the pilot's forearm 202 is $L_a$, as indicated at 206 in FIG. 2, the force F, required at the pilot's hand to move the stick 108 can be expressed by the equation $$F = K_s \theta_a L_a + B_s L_a \dot{\theta}_a \tag{1}$$

where $\dot{\theta}_a$ is the angle of movement of the pilot's arm as shown at 214 in FIG. 2, and $\theta_a$ is the rate of change of $\theta_a$ with time or the velocity of the position angle and where the small angle assumption of $\theta_a$ being approximately equal to the sine of $\theta_a$ is employed.

A second equation relevant to the FIG. 2 diagram can be obtained from a summation of torques about the stationary point 220, that is, about the pilot's elbow. This equation is of the form $$(m_a G_y L_a)/2 - F L_a = 0 \tag{2}$$

where $G_y$ is the G field acting in the y axis direction, and $m_a$ represents the mass of the pilot's forearm.

If equations (1) and (2) are combined, a third equation, equation (3) is provided:

$$\tfrac{1}{2} m_a G_y = K_s \theta_a + B_s \dot{\theta}_a \qquad (3)$$

A transfer function between the angle $\theta_a$ and the y axis G field component $G_y$ may be obtained from equation (3) and subjected to Laplace transformation to provide the equation:

$$\frac{\theta_a(s)}{m_a G_y(s)} = \frac{(\tfrac{1}{2})}{K_s + B_s s} \qquad (4)$$

If Laplace transformation is also applied to equation (1) above, an equation for F is obtained as follows:

$$F(s) = (K_s + B_s s) L_a \theta_a(s) \qquad (5)$$

Equations (4) and (5) may be combined to provide a final equation $$\frac{F(s)}{m_a G_y(s)} = \frac{1}{2} \qquad (6)$$

which shows that the force required at the control stick to counteract a G force field is proportional to the $G_y$ field strength and related to the $G_y$ field strength magnitude by a constant. The force applied to the control stick 108 using the computer in enclosure 116 may be developed in accordance with these relationships.

An apparatus capable of achieving negative biomechanical feedthrough in the aircraft environment represented in FIG. 1 is shown in FIG. 3 of the drawings. The FIG. 3 apparatus is in the nature of an electrical to mechanical transducer and includes a double acting piston and cylinder assembly 308 which is coupled by a mechanical connecting rod 306 to the rack 304 portion of a rack and pinion gear combination. The pinion 302 of this rack and pinion combination is connected with a control stick 300 that corresponds to the control stick 108 in FIGS. 1 and 2. This connection is arranged such that movement of the piston 310 laterally in the cylinder 309 causes lateral or y-axis movement of the control stick 300.

In the FIG. 3 apparatus the G force field indicated at 334 is sensed by the accelerometer 330, which serves as the G force to electrical signal transducer indicated at 114 in FIG. 1. The output of the accelerometer 330 is connected by an electrical path 332 to the analog computer 328 which incorporates the predetermined relationship algorithm described above. The output of the analog computer 328 is connected to a driver or buffer circuit 331 which provides an output having a pair of complementary current signals on the paths 327 and 329 that are capable of driving a pair of current versus fluid pressure transducer valves 316 and 318. The valves 316 and 318 are coupled by a pair of pressure fluid conduction paths 320 and 322 to opposite ends of the cylinder 309. The current versus pressure transducer valves 316 and 318 receive pressurized fluid from a source thereof by way of the conduit 325 and convey this fluid in varying pressure form to the piston pressure chambers 312 and 314 on opposing sides of the piston 310. The complementary nature of the two buffer output signals causes the fluid pressures in the paths 320 and 322 to also be complementary in nature.

Operation of the FIG. 3 apparatus, then, contemplates that a force proportional to the sensed G field at 334 will be applied by the mechanical connecting rod 306 to the control stick 300 with the direction of this force being in the negative feedthrough direction as described above and with the magnitude of this force being such that even at its maximum value the pilot can overcome or prevail against the feedthrough force. The feedthrough force is made proportional to the action of the G field on the pilot's forearm in accordance with the FIG. 2 analysis. It should be recognized that the direction of the force applied to the control stick does not reduce or eliminate the force required of the pilot in controlling the aircraft but actually increases the effort required of the pilot to hold a given stick position—the amount of increase, however, is correlated with the increased force the pilot's arm tends to exert by reason of the action of the G field or the arm and is therefore "invisible" to the pilot. The presence of this added force on the control stick improves the pilot's ability to control the aircraft by reducing the amount of muscle tremor which the pilot would otherwise impart to the control stick—especially at times of stick transition where agonistic and antagonistic muscle movements are required.

The algorithm relating the applied force magnitude to the sensed G field can of course be varied by changes in the programming or wiring of the computer 328 in accordance with experimentally obtained optimizing data. For example, in optimizing the computer algorithm, it may be found desirable to arrange the onset of the feedthrough force such that little negative feedthrough force occurs so long as the y axis G forces are below some predetermined threshold value, such as 1 G, and thereafter to uniformly increase the applied negative feedthrough force. Other algorithms relating G force field and applied negative biomechanical feedthrough force are of course possible and are within contemplation of the invention.

It should be noted that experimental results conducted on a G field inducing centrifuge indicate the desirability of maintaining the biomechanical feedthrough force in the negative polarity direction, that is, tending to return the control stick to a neutral position in response to a G force field acting on the pilot's arm, as opposed to positive biomechanical feedthrough, where the added force would tend to increase the stick displacement or add to the force the pilot is exerting on the control stick. Positive biomechanical feedthrough has been found to increase tracking error as is shown in FIG. 8 herein, and to also increase the work required of a pilot in the FIG. 1 situation.

As indicated above in the FIG. 3 apparatus, it is found desirable to make the biomechanical feedthrough force of such magnitude that the pilot can override this force when desired. This may be achieved in the FIG. 1 apparatus, for example, by using a compressed gas as the fluid supplied by the conduit 325 or alternately, may be achieved by allowing a liquid fluid used in the chambers 312 and 314 to be returned through the transducer valves 316 and 318 to a low-pressure sump, which is not shown in FIG. 3, upon attainment of predetermined pressures in the chambers 312 and 314 and in response to the application of pilot forces on the connecting rod 306. Other non-positive displacement arrangements can of course be fabricated.

Additional details concerning the computer 328 and driver circuits 331 are shown in FIG. 4 and FIG. 5 of the drawings; these details include a force versus driving current family of curves 500 for a typical cylinder 309 and pressure transducer valve combination at 316 and 318. Transducer valves of the type required at 316 and 318 are available as commercial items manufactured by Bellofram Corporation, of Burlington, Mass.; the part number 961-074-000 valve from this manufacturer can, for example, be employed in the FIG. 3 apparatus. A cylinder and piston assembly suitable for use at 309 in FIG. 3 can be fabricated using conventional machine tools and techniques known in the machining art: an assembly of this type has been routinely constructed at the Air Force Aerospace Research Laboratory, Wright-Patterson Air Force Base, Ohio in connection with the present invention. These components have been found suitable for use in ground-based modeling of the present invention apparatus; other components having similar operational characteristics may be desirable for use in an actual aircraft where physical size and weight are large considerations.

The FIG. 4 drawing is divided into two portions, buffer circuits 444 and driving circuits 446 in accordance with the blocks showing in the FIG. 3 block diagram. In the FIG. 3 diagram the buffer circuits are indicated at 331 and the driver circuits are presumed incorporated into the blocks 316 and 318. In keeping with this arrangement of the FIG. 4 circuitry, the family of curves 500 in FIG. 5 include an input current scale 506 that describes current flowing between the buffer and driver circuits, that is, current crossing the dotted line 417 in FIG. 4 to enter the base electrodes of the two transistors 426 and 428.

In the buffer portion of the FIG. 4 circuitry, the inversion amplifier 400 serves to generate a 180° out-of-phase electrical signal from the output of the analog computer 328 in order that complementary increasing and decreasing pressures can be applied to opposite ends of the cylinder 309; this inversion amplifier can be realized using an integrated circuit operational amplifier of the type available as a standard electronic hardware item. The potentiometers 402 and 404 in FIG. 4 serve to adjust the gain or calibration of the currents flowing in the base electrodes of the transistors 426 and 428 to thereby regulate the current in the collector electrodes to a range that is compatible with the windings of the transducer valves 316 and 318 in FIG. 3. The amplifiers 406 and 408 in FIG. 4 allow incorporation of a biasing signal into the currents supplied to the windings 440 and 442 in order that the transducer valves be operated near the midpoint of the linear operation range of valve characteristics. Linear approximations of the valve characteristics are shown at 512 and 518 in FIG. 5 and a pair of operating points near the midpoint of these linear approximations are indicated at 522 and 524. The bias levels indicated at 522 and 524 are introduced as positive input terminal voltages to the operational amplifiers 406 and 408 by way of source terminals 410 and 412.

In the driver circuit portion of FIG. 4 a pair of grounded emitter bipolar NPN transistors are shown connected as grounding switches for the series circuits which include the transducer pressure valve windings 440 and 442 and a pair of current limiting or current forcing resistors 436 and 438. The magnitude of the base drive current to the transistors 426 and 428 is controlled by the series resistors 418 and 420 while an undesirable reverse polarity condition between the base and emitter electrodes of the transistors 426 and 428 is precluded by the shunting diodes 422 and 424. The electrical size of the resistors 418, 420, 436 and 438 in FIG. 4 may be selected in accordance with the voltage levels employed, the types of transistors used, the valve winding characteristics and other circuit parameters in a manner which is known in the circuit design art. According to one embodiment of the FIG. 4 apparatus, the resistors 436 and 438 can have values of 510 ohms each, the collector supply voltage at the terminal 430 can have a value of +15 volts, and the base drive resistors 418 and 420 can have values of 51 kiloohms each.

Other arrangements for the FIG. 4 driver circuitry can of course be achieved, one such arrangement could include the use of an operational amplifier or other feedback amplifier in lieu of the transistors 426 and 428, thereby possibly lowering the base drive currents IB1, IB2 flowing from the amplifiers 406 and 408 as indicated at 414 and 416 in FIG. 4, and providing valve winding current levels which are largely independent of semiconductor characteristics. With different transducer valves employed at 316 and 318 in FIG. 3, and the resulting different valve winding resistances, other values for the collector voltage supply 430 and the collector currents 432 and 434 may also be desirable. It may also be desirable in some embodiments of the FIG. 4 circuitry to include a free-wheeling or flyback diode connected between the collector electrode of each of the transistors 426 and 428 and ground with the diode anode grounded. Such diodes would preclude the development of high voltage spikes at the transistor collectors upon cessation of current flow in the inductances of the valve windings 440 and 442. These and similar modifications of the FIG. 4 circuitry are well known in the transistor circuit art.

The characteristics of a typical pair of transducer valves (i.e., the valves identified above) for use at 316 and 318 in FIG. 3 are shown in FIG. 5 of the drawings. In the FIG. 5 characteristics, the scale 502 represents pounds per square inch of fluid pressure delivered to the cylinder 309; alternately, since the face areas of the piston 310 are fixed, a scale 502 can also represent pounds of force delivered by the mechanical connecting rod 306. The vertical scale 504 in FIG. 5 represents input voltage applied to the windings of the transducer valves, while the vertical scale 506 represents current flowing into a typical pair of valve driving transistors as was shown at 426 and 428 in FIG. 4. The characteristics shown at 508 and 510 in FIG. 5 represent the rightwise movement of the piston 310, while the characteristics 514 and 516 in FIG. 5 represent movement of the piston 310 to the left. The difference in curve slope and force output values for the left and right movements of the piston 310 results from the different areas of the piston faces indicated at 324 and 326 in FIG. 3—because the mechanical connecting rod 306 makes the face area A2, 324, smaller than the face area A1, 325 in FIG. 3.

As indicated by the separation between the curves 508 and 510 and the curves 514 and 516, practical embodiments of the pressure transducer valves are subject to hysteresis and friction effects; the linear approximations 512 and 518 described earlier are therefore convenient for most purposes in applying valve characteristics. It may be noted that the zero value on the driver circuit current input scale 506 occurs at a value of 0.7 volts on the voltage scale 504; this 0.7 volt value represents the PN junction voltage drop occurring in bipolar transistors, as is known in the transistor circuit art.

For purposes of evaluating the improvements resulting from a negative biomechanical feedthrough apparatus of the type shown in FIG. 1 without incurring the cost and inconvenience of aircraft flight or even human centrifuge testing time, and also for training or acclimating test subjects to the behavior of a negative biomechanical feedthrough system, it is convenient to simulate the response of such a system in a static or normal 1.0 $G_z$ environment as found in ordinary life. Although the effects of lateral or y axis G forces and front-back x-axis forces are absent in this environment, meaningful indications of control stick characteristics and pilot response to such stick characteristics can nevertheless be realized in such a simulation. An underlying concept in such a simulation is the imitation of forces that appear in the lateral $G_y$ environment, forces which appear on the forearm of the pilot 106, and forces which comprise the negative biomechanical feedthrough force expected in an aircraft environment. According to this simulation concept then, the force applied to the control stick 300 is modified for simulation purposes to the value which occurs in an aircraft environment, a force representing the G field force expected with lateral movement of the aircraft.

A system capable of simulating a FIG. 1 type aircraft negative biomechanical feedthrough embodiment is shown in FIG. 6 of the drawings; this system includes a simulated aircraft control stick 604, a visual display (preferably of the electronic or cathode ray tube type) 630 and a force generating apparatus connected with the control stick 604 in the form of the closed loop arrangement 600. The FIG. 6 apparatus is preferably disposed in the manner of a flight simulator and in a fashion resembling the FIG. 1 aircraft cockpit for use in the realistic testing and training of human subjects in the use of negative biomechanical feedthrough systems. In such a flight or cockpit simulator arrangement the display 630 could be located in the position of the instrument panel 110 and the control stick 604 positioned with respect to a seat 107 and a pilot 106 in the general manner indicated for the control stick 108 or alternately placed to one side of the pilot's seat as is accomplished in some aircraft.

The display 630 employed in the FIG. 6 simulator apparatus may be arranged to have a fixed position target in the form of a circle, for example, located near the center of an illuminated cathode ray tube screen and to further include a movable cursor in the form of a cross, for example, which is to be maintained in alignment with the fixed position target through the efforts of the test subject received on the control stick 604. The forearm 602 and the fixed position elbow 626 participate in the simulator environment in the manner described in connection with the FIGS. 1 and 2 aircraft cockpit above.

In addition to the control stick 604 and display 630, the FIG. 6 apparatus includes an electrical signal derived from a circular potentiometer to represent the position of the control stick 604, this signal communicated along the path 606 together with a random disturbance input signal 611 are impressed on a summation amplifier 608 to generate a composite signal 610 which represents the effective position of the control stick 604. The random disturbance input signal 611 might represent wind effects on an aircraft and within the simulator environment provides the excitation function or the stimulus input which the simulator pilot is called upon to track. The disturbance signal may be composed of a sum of sine waves, preferably a summation of at least five sine waves of differing fundamental frequency, and dispersed phase relationship, such as is described in the copending patent application of one inventor hereof, Ser. No. 645,390 filed Aug. 29, 1984. In the August 1984 application pseudo-random signals generated by sine wave summation for use in a light bar apparatus are described. The disclosure of the light bar application is hereby incorporated by reference into the present specification.

The control stick position signal at 610 which incorporates the random disturbing function input is converted to a position vector signal of changing position value through the use of an analog model of the aircraft being simulated in block 612 of FIG. 6. Changes in the position vector signal output of block 612 in reality define an equation of motion for a simulated aircraft. Actually this motion can be considered yaw axis motion. This motion signal is fed along the path 632 to the display 630 in order to cause a movement of the display cursor which resembles the movement of an aircraft that would incur in response to a change in position of the control stick 604 and wind deflections. The task assigned to the subject operating the control stick 604 therefore is to maintain the movable cursor in alignment with the fixed position target on the screen of the display 630, despite the variations introduced in cursor position by the random disturbance input 611.

The success or skill with which the test subject is able to maintain the moving cursor and the fixed position target in alignment is evaluated in the scoring circuit 634 which receives signals indicating differences between target and cursor positions along the path 628 from the display 630. Scoring can be accomplished in accordance with a root-mean-square criteria which is also described below and in the above-incorporated by reference copending patent application.

According to the thus-far described portions of FIG. 6 then, the disturbance input 611 imparts a random movement to the display cursor while the static positioning of the control stick 604 in a non-home position adds a velocity to the cursor. Together the pilot input and the disturbance input cause the cursor to dart about the screen with the pilot's recovery corrections following or curtailing this darting action. The velocity of cursor movement from the pilot input is dependent upon the displacement of the control stick 604 from the home position and also on the electrical gain in the system between the control stick potentiometer and the display 630. This electrical gain is the same gain which is plotted along the axis 700 in FIG. 7.

The signals representing position and motion received from the aircraft model in the block 612 are used in the block 614 to generate a signal at 616 which represents an estimate of the G force field acting on the aircraft in response to the change of position or motion signal. The block 614 therefore incorporates a representation of aircraft characteristics in the sense of relating instantaneous change of position i.e., motion, to instantaneous values of G force field. Once a value of G force field is established by the signal along path 616, the force acting at the center of gravity in the pilot's forearm can be computed as represented by the block 618 and this force can be translated to the force acting at the pilot's wrist—the point of contact with the control stick 604 in the block 622. The center of gravity force signal at 620 is computed from the G force field signal at 616 using the well-known $F=MA$ relationship. The final control stick force values computed in the translation of block 622 are to be supplied along the path 624 through the use of a FIG. 3 type cylinder and piston arrangement, as described above.

The FIG. 6 apparatus therefore even in the absence of an y axis G force field is capable of usefully simulating the behavior of an aircraft control stick which has been improved with the negative biomechanical feedthrough arrangement of the present invention. This simulation is useful for both evaluating the improvement in tracking error ability of human test subjects as described in FIG. 7, and also in training pilots in the use of aircraft and ground simulator negative biomechanical feedthrough systems.

The block 614 is a result of simulating the Gy produced in an F-16 or other aircraft as a result of a position change $\theta p$ (yaw axis movement). This relationship can be expressed by a transfer function of the form $$\frac{\dot{Gy}}{\theta p} = \frac{\text{Constant}}{S^1}$$

where S=the Laplace transform variable, and the constant is evaluated by comparing the simulation to empirical data from an aircraft.

FIG. 7 in the drawings shows the improvement in human test subject tracking ability resulting from the addition of negative biomechanical feedthrough to a simulation of the FIG. 1 aircraft scenario. The curve 706 in FIG. 7 indicates the tracking performance of six test subjects, male Air Force pilots between ages 23 and 35 years, plotted against a vertical scale 702 of root mean square error and against a horizontal scale 700 indicating three different values of control stick position to cursor target velocity gain as was described in connection with FIG. 6 above. The curve 704 in FIG. 7 indicates the tracking ability of the same test subjects when performing on the same simulation set-up with the addition of negative biomechanical feedthrough. The lower values of RMS error relating to the curve 704 in FIG. 7 indicates the improved tracking performance realized with negative biomechanical feedthrough.

The root-mean squared error values displayed in FIG. 7 may be computed using the equation $$e_{RMS} = \left[ 1/N \sum_{i=1}^{N} e_i^2(t_i) \right]^{\frac{1}{2}}$$

where $e_{RMS}$ is the desired error signal as is plotted in accordance with the scale 702 in FIG. 7, $e_t$ is an individual error value, N is the number of samples of the error $e_t$ during the time period of interest, and $t_i$ is the time duration of an individual error. The $e_{RMS}$ values are usable for overall comparison scoring purposes between different test subjects.

The vertical bars at 708, 710, 712, 714 and 716 in FIG. 7 indicate the degree of data dispersion among the six test subjects for each of the represented test conditions. These dispersion values indicate the one standard deviation limits for the results spread among the six test subjects, and may be computed in accordance with the equation $$D = [1/N(X_i - \overline{X})^2]^{\frac{1}{2}}$$

where $X_i$ equals the difference between the subject error values for a given set of conditions, $\overline{X}$ equals the mean of the values among the six test subjects, as is plotted at the center of the dispersion values in FIG. 7, and N is the number of samples, or six. The characterizing of data of this type according to statistical methods, is well known in the art, and is therefore summarily indicated here.

As indicated by the wide values of dispersion at 714 and 716 in FIG. 7, with the use of high values of stick gain where small control stick displacements provide large display cursor velocities, the pilot error increases and the improvement between a passive control stick and a control stick having negative biomechanical feedthrough is not easily distinguished. At low gain values where large control stick displacements are required to achieve finite velocities of the display cursor, the FIG. 7 dispersion values are also somewhat large and the error rates are above the minimum value. For moderate gain conditions, a gain of 5, as indicated at 718 in FIG. 7 the minimum value of error and the minimum data dispersion are observed. The relatively low value of dispersion in the minimum RMS error value indicated at 718 in FIG. 7 therefore suggest that moderate gains are preferable in embodying a negative biomechanical feedthrough system. It is particularly notable that the RMS error values at 718 are one-half or less of the error values achieved with a passive control stick arrangement using the same test subjects and the same test apparatus.

A family of curves similar in nature to FIG. 7 is shown in FIG. 8 of the drawings, these curves employ a common error axis along the $e_{RMS}$ vertical scale and the similar or repeated electrical gain scales 800, 802 and 804. In FIG. 8 the curve 808 relates to a static tracking condition, as was represented in 706 at FIG. 7, and the curve 810 relates to a control or baseline condition wherein static tracking under a slightly increased z direction G force field is present. The z direction field is, of course, the field direction tending to hold the pilot more firmly in his seat. A pair of curves 812 and 814 in FIG. 8 shows the notable error difference obtained with positive and negative biomechanical feedthrough arrangements. Although the FIG. 8 data represents the performance of only a single test subject, the trend noted in FIG. 7 is emphasized with negative biomechanical feedthrough providing the most desirable tracking response for any of the represented gain values and the positive biomechanical feedthrough curve 812 associates with the least desirable or most error supporting of the indicated tracking conditions.

An explanation for the improved ability of a human test subject to perform tracking tasks with the use of negative biomechanical feedthrough is a subject of some conjecture and continuing investigation. In the article "A Controlled Theoretic Approach to Manned Vehicle System Analysis", appearing in the *IEEE Transactions on Automatic Control*, Vol. AC-16, pp. 824–832, 1971, written by D. L. Kleinman, S. Baron and W. H. Levison, (the Kleinman article) which is hereby incorporated by reference, the subject of neuromotor dynamics is discussed and neuromotor model equations are developed.

Included in the FIG. 2 model of the Kleinman article is a frequency selective filter of characteristics $1/(\tau_N S + 1)$ and having a half power point located at a frequency of 10 radians per second or 1.6 Hertz for typical $\pi_N$ values of 0.1 second. Clearly filters of this low-pass nature may be used in segregating a 12-15 Hertz muscle tremor signal from lower frequency G field related signals.

A relationship known as Weber's law is also known to be active in neuromotor dynamics, this relationship indicates that for twice the force output of a human member such as a forearm, the noise component or muscle tremor introduced by the human will also be doubled, that is, force and noise are proportional quantities.

An interesting physiological effect has been noted with use of the negative biomechanical feedthrough apparatus. During normal tracking tests, it is observed that the normal hand movements in the inward and outward direction activate both antagonistic and agonistic muscles; this effect is most pronounced at null points or inflection points, where the human subject is called upon to reverse the direction of his applied force and muscle tremor or noise results from this force reversal process. Such muscle tremor has been found to have fundamental frequency or natural frequency components in the range of 12 to 15 Hertz. Muscle tremor effects in this frequency range can be distinguished from G field force effects which are, of course, of lower frequency (i.e., longer period) by frequency responsive means made selective of the 12-15 Hertz frequency band.

With the negative biomechanical feedthrough apparatus, however, only a single type of muscle movement appears to be required because the negative biomechanical feedthrough effect replaces at least in part, the second muscle movement. This replacement precludes the change in direction, delaying time involved in switching muscles, and thereby the induced tremor noise. One analysis of this condition indicates human operator neuromotor bandwidth increases by a factor of 3 with the use of a negative biomechanical feedthrough apparatus and a lower value of covariance Q in the above two equations for the noise output consequently results.

Although the present invention has been described in terms of a G force responsive system applicable to the aircraft pilot scenario, the concepts of reducing neuromotor tremor, that is, improving the tendency of a human subject to introduce oscillations of about 12 Hz natural frequency into a control system and the other concepts described above are believed applicable to many fields of endeavor. The concepts described herein are also not limited to human pilot or test subject endeavors and one applicable to feedback control systems involving animal and other living organisms.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Aircraft lateral tracking improvement apparatus comprising:
   aircraft maneuvering controls located adjacent a pilot supporting seat in an aircraft cockpit apparatus;
   means for conveying a prescribed lateral course to be tracked and a tracking error signal to said pilot;
   means for generating a signal representing the incurred G force acceleration of said aircraft along an axis lateral of said pilot;
   means including predetermined twelve to fifteen Hertz frequency agonistic to antagonistic muscle transfer tremor attenuation means for generating a maneuvering control bias electrical signal in response to said lateral G force acceleration signal; and
   bias force transducer means connected with said maneuvering controls and responsive to said bias electrical signal for applying a muscle tremor attenuation lateral bias force supplementary to one of said agonistic and antagonistic muscle forces to said maneuvering controls.

2. The apparatus of claim 1 wherein said aircraft cockpit apparatus comprises a single control stick operated aircraft.

3. The apparatus of claim 2 further including arm restraint means connected with said cockpit apparatus for stabilizing the maneuvering control operating arm of said pilot during occurrence of said G force acceleration.

4. The apparatus of claim 3 wherein said means for conveying a prescribed course and a tracking error signal to said pilot include visual observation by said pilot.

5. The apparatus of claim 4 wherein said means for supplying a biasing force is connected to decrease the pilot exertion required during said agonistic to antagonistic muscle pair transfer movements.

6. The apparatus of claim 5 wherein said biasing force urges said maneuvering controls toward a neutral control position.

7. The apparatus of claim 1 wherein said aircraft cockpit apparatus is a portion of a flight simulator trainer.

8. The apparatus of claim 7 wherein said means for conveying in said flight simulator trainer includes an electronically controlled flight display.

9. The apparatus of claim 8 wherein said signal responsive to incurred G force acceleration is responsive to pilot manipulation of maneuvering controls in said flight simulator and to a simulation of aircraft characteristics in response to said pilot manipulation.

10. The apparatus of claim 9 wherein said predetermined algorithm includes frequency selective means responsive to a tremor movement signal in the range of 12 to 15 Hertz natural frequency.

* * * * *